United States Patent
Jogan

(10) Patent No.: US 6,585,147 B2
(45) Date of Patent: Jul. 1, 2003

(54) FRICTION AGITATION JOINING METHOD

(75) Inventor: Shigetoshi Jogan, Osaka (JP)

(73) Assignee: Showa Aluminum Corporation, Osaka (JP)

( * ) Notice: Subject to any disclaimer, the term of this patent is extended or adjusted under 35 U.S.C. 154(b) by 0 days.

(21) Appl. No.: 09/782,715

(22) Filed: Feb. 13, 2001

(65) Prior Publication Data

US 2002/0000461 A1 Jan. 3, 2002

(30) Foreign Application Priority Data

Jun. 30, 2000 (JP) ........................... 2000-197524

(51) Int. Cl.[7] ................. B23K 37/00; B23K 20/12; B23K 31/02
(52) U.S. Cl. ............... 228/112.1; 228/2.1; 156/73.5; 156/580
(58) Field of Search .............. 228/112.1, 2.1, 228/114.5; 156/580, 73.5

(56) References Cited

U.S. PATENT DOCUMENTS

| | | | | |
|---|---|---|---|---|
| 5,591,360 A | * | 1/1997 | Mombo-Caristan | 219/121.64 |
| 5,697,544 A | * | 12/1997 | Wykes | 156/580 |
| 5,813,592 A | * | 9/1998 | Midling et al. | 156/580 |
| 6,045,027 A | * | 4/2000 | Rosen et al. | 228/112.1 |
| 6,050,474 A | * | 4/2000 | Aota et al. | 156/73.5 |
| 6,173,880 B1 | * | 1/2001 | Ding et al. | 156/73.5 |
| 6,193,137 B1 | * | 2/2001 | Ezumi et al. | 228/112.1 |
| 6,299,050 B1 | * | 10/2001 | Okamura et al. | 156/73.5 |
| 6,328,261 B1 | * | 12/2001 | Wollaston et al. | 228/112.1 |
| 2001/0019073 A1 | * | 9/2001 | Ezumi et al. | 228/112.1 |
| 2002/0079352 A1 | * | 6/2002 | Ezumi et al. | 228/112.1 |

FOREIGN PATENT DOCUMENTS

| | | | | |
|---|---|---|---|---|
| GB | 2306366 A | * | 5/1997 | ............. 228/112.1 |
| JP | 10193143 | | 7/1998 | |
| JP | 10-249553 | | 9/1998 | |
| JP | 10249553 | | 9/1998 | |
| JP | 10-249553 A | * | 9/1998 | ............. 228/112.1 |
| JP | 11-320128 A | * | 11/1999 | ................ 228/2.1 |
| JP | 11-342481 A | * | 12/1999 | ............. 228/112.1 |
| JP | 2000-202646 A | * | 7/2000 | ................ 228/2.1 |

OTHER PUBLICATIONS

English language Abstract of Japanese Patent No. 10–249553.

* cited by examiner

*Primary Examiner*—Tom Dunn
*Assistant Examiner*—L. Edmondson

(57) ABSTRACT

In a friction agitation joining method for joining two plate-shaped joining members butted against each other with a level difference formed at upper surface sides thereof by a joining tool having a probe rotatable about a rotation axis thereof, the butted joining members are arranged so as to be inclined to a horizontal plane with one of the joining members having a higher upper surface level positioned at a lower side and the other at a higher side. Then, the rotating probe is inserted into a butted portion of the joining members or the vicinity thereof in a state that the rotation axis is parallel to a vertical plane extending along the butted portion. Then, the probe is moved relative to the joining members along the butted portion with the probe inserted into the butted portion or the vicinity thereof.

11 Claims, 5 Drawing Sheets

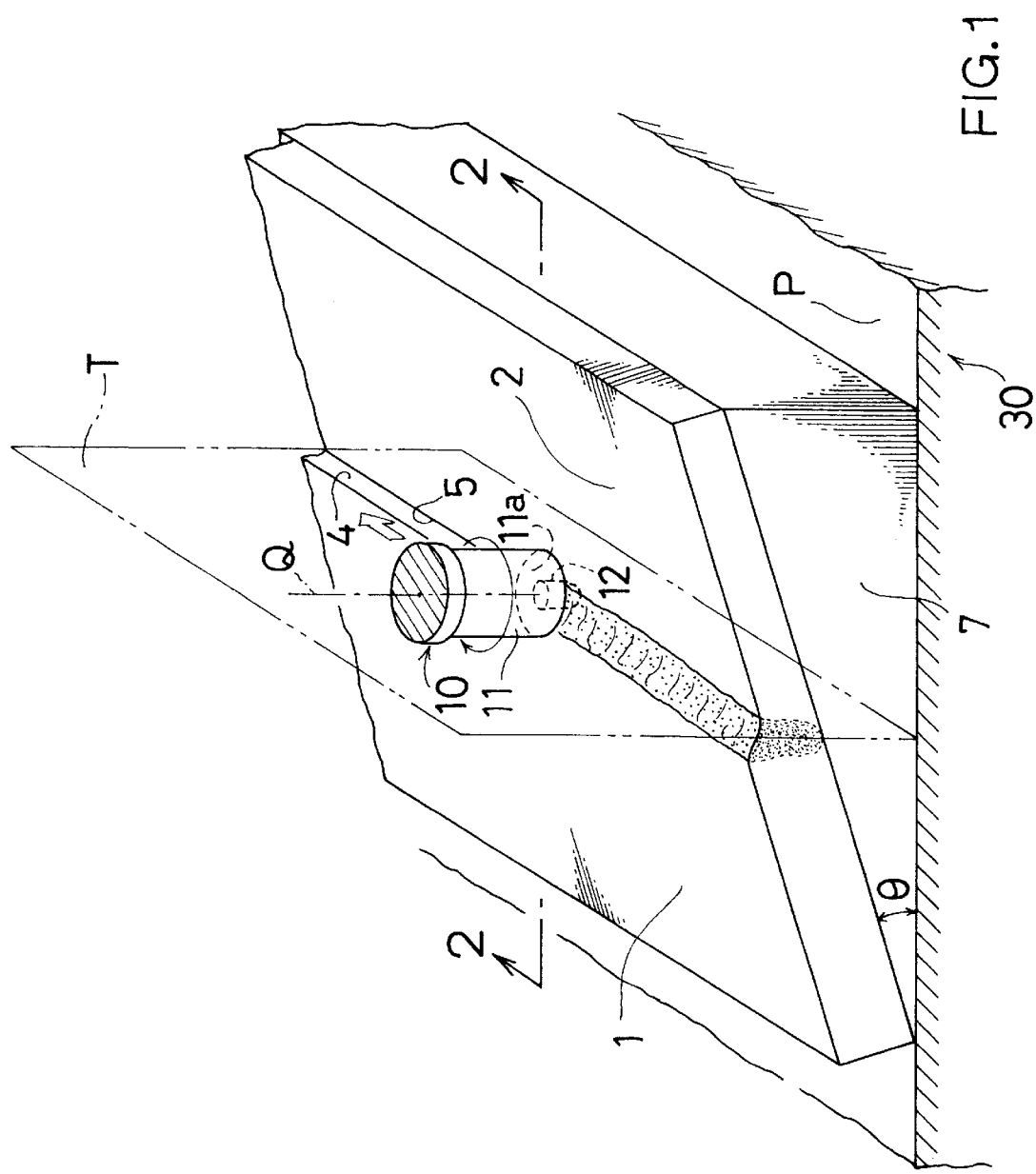

FRICTION AGITATION JOINING METHOD

BACKGROUND OF THE INVENTION

1. Field of the Invention

The present invention relates to a friction agitation joining method for joining metallic members such as aluminum or its alloy members butted against each other. More particularly, the present invention relates to a friction agitation joining method for use in manufacturing, for example, tailored blank members, suspension arm members or engine mount members for automobiles, body panels for railroad vehicles and/or vessels, and electric mechanical members.

2. Description of Related Art

A friction agitation joining method belongs to a category of a solid-phase joining method. The friction agitation joining method has such advantages that it can be applied to various metal joining members regardless of the materials and that joining members are hardly deformed by thermal strains at the time of joining. Thus, in recent years, the method has been used for joining various structural members.

FIG. 5A shows two pieces of plate-like metal joining members butted against each other to be joined by a friction agitation joining method.

In FIG. 5A, the reference numeral "51" denotes a thicker plate-shaped metal first joining member and "52" a thinner plate-shaped metal second joining member. These joining members 51 and 52 are arranged such that the lateral side surfaces thereof are butted against each other with the lower surfaces thereof flush with each other. Thus, a level difference corresponding to the thickness difference thereof is formed at the upper surface sides thereof. The reference numeral "55" denotes a butted portion of the joining members 51 and 52. The reference numeral "54" denotes a stepped portion formed at the butted portion 55 on the upper surface sides of the joining members 51 and 52.

In FIG. 5B, the reference letter "A'" denotes a joining device for performing a but-joining. This joining device A' is comprised of a joining bed 80 (see FIG. 5A), a joining tool 60 for performing a friction agitation joining and an elevator 70.

The joining bed 80 is arranged such that the upper surface 81 thereof is disposed horizontally. On this upper surface 81, both the aforementioned joining members 51 and 52 are placed with their upper surfaces thereof facing up. In these joining members 51 and 52, the first joining member 51 corresponds to a joining member having a higher upper surface level as seen from its surface side, and the second joining member 52 corresponds to a joining member having a lower surface level as seen from its surface side.

The elevator 70 is arranged above the joining members 51 and 52 and capable of ascending and descending vertically.

The joining tool 60 having a rotation axis Q' is provided with a pillar-like rotor 61 having a larger diameter and formed about the rotation axis Q' and a pin-like probe 62 having a smaller diameter and integrally protruded from the rotation central portion of the end surface 61a of the rotor 61 along with the rotation axis Q'. This joining tool 60 is equipped to a rotation driving apparatus (not shown) for rotating the rotor 61 and the probe 62 about the rotation axis Q'. In the joining tool 60, the peripheral edge of the end surface 61a of the rotor 61 is placed within the plane perpendicular to the rotation axis Q'. As shown in FIG. 5B, the end surface 61a of the rotor 61 is formed to have a flat surface perpendicular to the rotation axis Q'.

By the way, in cases where both the butted joining-members 51 and 52 are joined in a state that the stepped portion 54 is formed on the upper surfaces thereof, stress concentration will generate in the stepped portion 54 of the obtained joined portion, resulting in deteriorated strength reliability. Moreover, during the joining process, some materials of the joining members 51 and 52 softened by the frictional heat disperses from near the probe 62, resulting in joint defects due to insufficient materials.

SUMMARY OF THE INVENTION

It is an object of the present invention to provide a friction agitation joining method which is favorably used for joining two plate-shaped joining members butted against each other such that a level difference is formed at upper surface sides thereof.

It is another object of the present invention to provide a friction agitation joining method which can enhance the joining operation efficiency of the aforementioned butted joining members.

Another objects of the present invention will be apparent from the following embodiments of the present invention.

In order to attain the aforementioned objects, according to the present invention, a friction agitation joining method for joining two plate-shaped joining members butted against each other with a level difference formed at upper surface sides thereof by utilizing a joining tool having a probe rotatable about a rotation axis thereof, comprising the steps of:

arranging the butted joining members so as to be inclined to a horizontal plane with one of the joining members having a higher upper surface level positioned at a lower side and the other of the joining members having a lower upper surface level positioned at a higher side;

inserting the probe rotating about the rotation axis into a butted portion of the butted joining members or the vicinity thereof in a state that the rotation axis is parallel to a vertical plane extending along the butted portion; and moving the probe relative to the joining members along the butted portion with the probe inserted into the butted portion or the vicinity thereof.

According to the aforementioned friction agitation joining method, by downwardly moving the joining tool in the vertical direction, the probe can be quickly inserted into the butted portion of the joining members or its vicinity. This increases the insertion speed of the probe, resulting in enhanced joining operation efficiency.

It is preferable that the step of inserting the probe is performed in a state that the rotation axis is disposed vertically. In this case, the probe can be inserted more quickly. This further increases the probe insertion speed, resulting in further enhanced joining operation efficiency. Furthermore, as compared to the case where the joining tool is inclined so that the probe can be inserted into the butted portion of the joining members in an inclined state, it becomes possible to prevent the inclination of the joining tool due to the influence of gravity because the rotation axis of the probe is disposed vertically. Accordingly, a joined member with an excellent joined portion can be obtained.

Furthermore, it is preferable that the joining tool is attached to an elevator disposed above the butted joining members and capable of ascending and descending vertically and that the step of inserting the probe is performed by descending the elevator. In this case, the insertion of the probe can be performed with high efficiency by utilizing the elevator without attaching any additional device for inserting the probe.

Furthermore, it is preferable that the joining tool is provided with a rotor having a diameter larger than a diameter of the probe protruded from a part of an end surface of the rotor, the rotor being capable of rotating about the rotation axis, and that the step of moving the probe relative to the joining members is performed in a condition that the end surface of the rotor rotating about the rotation axis presses a shoulder portion of one of the joining members having a higher upper surface level formed at the butted portion. In this case, since the end surface of the rotor presses the shoulder portion of one of the joining members having a higher upper surface level formed at the butted portion, the shoulder portion will be plastically deformed into an inclined surface due to the pressing force. Consequently, stress concentration, which may be generated at the stepped portion, can be reduced.

Furthermore, it is preferable that the end surface of the rotor vertically presses the shoulder portion. In this case, the shoulder portion can be plastically deformed quickly, resulting in enhanced joining operation efficiency.

Furthermore, it is preferable that the joining tool is equipped to an elevator disposed above the joining members and capable of ascending and descending vertically and that the end surface of the rotor presses the shoulder portion by descending the elevator. In this case, pressing the shoulder portion can be performed with high efficiency by utilizing the elevator without attaching any additional device for pressing the shoulder portion.

Furthermore, it is preferable that the joining members are arranged so as to be inclined at from 3° to 45° to a horizontal plane. If the angle to a horizontal plane is less than 3°, it becomes difficult to deform the shoulder portion of one of the joining members having a higher surface level. On the other hand, if the angle exceeds 45°, the edge of the rotor comes into contact with the surface of the other of the joining members having a lower surface level, which may prevent the insertion of the probe into the butted portion or its vicinity. Accordingly, it is preferable that the joining members are arranged so as to be inclined at from 3° to 45° to a horizontal plane, more preferably from 5° to 10° to a horizontal plane.

Furthermore, it is preferable to provide a stand having an upper surface inclined to a horizontal plane, and the joining members are arranged on the inclined upper surface of the stand to thereby be inclined to a horizontal plane. This enhances the inclined arrangement of the joining members.

Furthermore, it is preferable that the probe is rotated at a rotation speed of from 1000 rpm to 3000 rpm.

Furthermore, it is preferable that one of the joining members having a higher upper surface level is thicker than the other of the joining members having a lower upper surface level, and wherein the one of the joining members having a higher upper surface level and the other of the joining members having a lower upper surface level are butted against each other with bottom surfaces thereof flush with each other.

Other objects and the features of the present invention will be apparent from the following detailed description of the invention with reference to the attached drawings.

BRIEF DESCRIPTION OF THE DRAWINGS

The present invention will be more fully described and better understood from the following description, taken with the appended drawings, in which:

FIG. 1 is a perspective view showing a friction joining method according to an embodiment of the present invention;

DETAILED DESCRIPTION OF THE PREFERRED EMBODIMENT

Figure 2A:
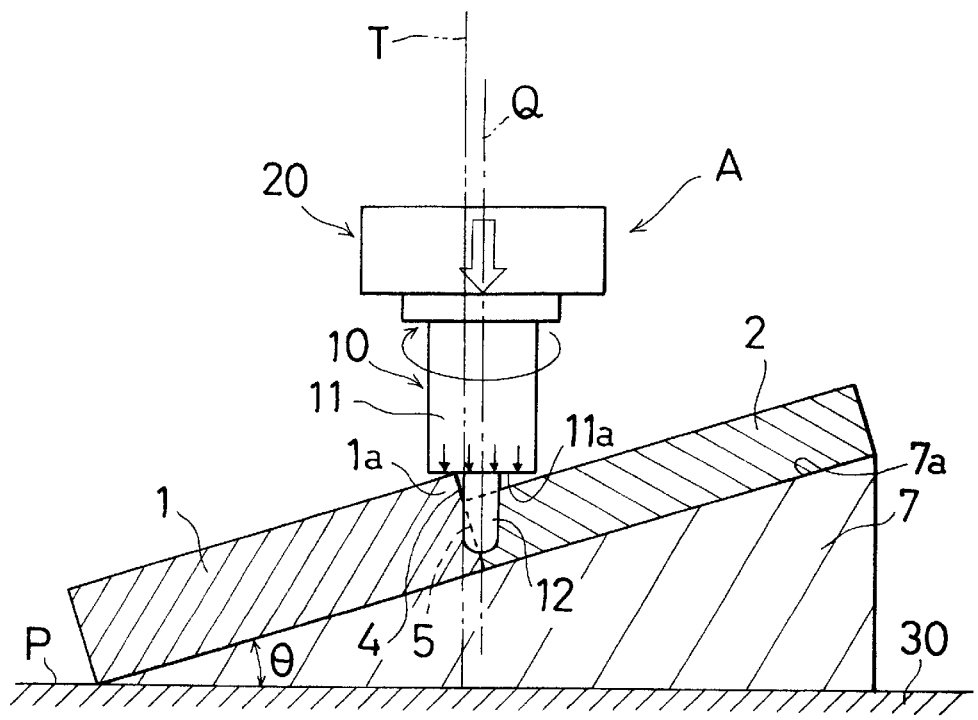
FIG. 2A is a cross-sectional view taken along the line 2—2 of FIG. 1.

Next, a preferred embodiment of the present invention will be explained with reference to drawings.

In FIG. 1, the reference numeral "1" denotes a first joining member in the shape of an elongated thick plate, and "2" a second joining member in the shape of an elongated thin plate. Both of these joining members 1 and 2 are made of aluminum or its alloy.

Each of the joining members 1 and 2 has a longitudinal side surface to be butted against with each other. The side surface is perpendicular to the upper and lower surfaces of the joining members 1 and 2, as shown in FIG. 2A. These joining members 1 and 2 are butted against each other at their side surfaces so that the lower surfaces thereof are flush with each other. Thus, the level difference corresponding to the thickness difference of the joining members 1 and 2 is formed at the upper surface sides thereof. The reference numeral "5" denotes a butted portion of the joining members 1 and 2. The reference numeral "4" denotes a stepped portion formed at the butted portion 5.

In FIG. 2A, "A" denotes a joining device for performing a but-joining. This joining device A is comprised of a joining bed 30, a joining tool 10 for friction agitation joining and an elevator 20.

The joining bed 30 is arranged such that the upper surface P thereof is disposed horizontally. On the upper surface P, a stand 7 of a triangular shape in cross-section is placed. This stand 7 has an installation surface 7a inclined to a horizontal plane. On the installation surface 7a, both the joining members 1 and 2 are disposed with the thinner second joining member 2 positioned higher than the thicker first joining member 1. Thus, both the joining members 1 and 2 are inclined to a horizontal plane.

In the present invention, it is preferable that both the joining members 1 and 2 are disposed so as to be inclined at from 3° to 45° to a horizontal plane, more preferably from 5° to 10°. In FIG. 2A, "θ" denotes an angle of inclination of the joining members 1 and 2 to a horizontal plane. In FIG. 1, "T" denotes a vertical plane extending along the butted portion 5 of the joining members 1 and 2.

The joining tool 10 has a rotation axis Q, and is provided with a larger diameter pillar-like rotor 11 and a smaller diameter pin-like probe 12 integrally extending from the center of the end surface 11a of the rotor 11 along the rotation axis Q. This joining tool 10 is equipped with a rotation driving apparatus (not shown) for rotating the rotor 11 and the probe 12 about the rotation axis Q. Thus, the rotor 11 and the prove 12 rotate in accordance with the operation of the rotation driving apparatus. In this joining tool 10, the peripheral edge of the end surface 11a of the rotor 11 is in the plane perpendicular to the rotation axis Q, and the end surface 11a of the rotor 11 is formed to have a flat surface perpendicular to the rotation axis Q.

The rotor 11 and the probe 12 are made of heat-resistant materials which are harder than the materials of both the joining members 1 and 2 and can bear against the frictional heat generated during the joining. Provided on the outer surface of the probe 12 are protrusions (not shown) for agitating the materials of the joining members 1 and 2 softened by the frictional heat.

The elevator 20 is capable of ascending and descending vertically, and is arranged above the joining members 1 and 2. The aforementioned joining tool 10 is attached to the elevator 20 such that the rotation axis Q of the joining tool is disposed vertically. Thus, the end surface 11a of the rotor 11 of the joining tool 10 is arranged horizontally. Therefore, in accordance with the downward movement of the elevator 20, the rotor 11 and the probe 12 of the joining tool 10 are moved downwards vertically (namely, in the direction of the rotation axis Q). Accordingly, the end surface 11a of the rotor 11 is moved downwards vertically while keeping the horizontal state.

Next, the steps for joining the joining members 1 and 2 will be explained.

First, the rotor 11 and the probe 12 of the joining tool 10 are disposed above the butted portion 5 of the joining members 1 and 2 so that the rotation axis Q of the joining tool 10 becomes parallel to the vertical plane T extending along the butted portion 5. In this embodiment, the rotor 11 and the probe 12 are arranged such that the rotation axis Q thereof is disposed vertically. Subsequently, the rotor 11 and the probe 12 are integrally driven to be rotated about the rotation axis Q. By descending the elevator 20, the rotor 11 and the probe 12 move downwards vertically, i.e., in the direction of the rotation axis Q. Thus, the probe 12 is inserted into the butted portion 5 of the joining members 1 and 2 from the upper surface sides thereof, and the end surface 11a of the rotor 11 vertically presses a shoulder portion 1a projected from the butted portion 5 of the first joining member 1. At this time, since the rotation axis Q of the joining tool 10 is disposed vertically, the probe 12 can be inserted easily.

Due to the frictional heat generated in accordance with the rotation of the probe 12 and the frictional heat generated by the mutual contact between the end surface 11a of the rotor 11 and the shoulder portion 1a of the first joining member 1, the probe-inserted portion of the joining members 1 and 2 and therearound are softened, and the shoulder portion 1a is plastically deformed into an inclined surface by being pressed by the end surface 11a of the rotor 11. At this time, as shown in FIG. 2A, the end surface 11a of the rotor 11 is disposed horizontally, and the pressing force of the end surface 11a against the shoulder portion 1a is exerted to the end surface 11a perpendicularly. This enables a quick plastic deformation of the shoulder portion 1a.

In this way, while plastically deforming the shoulder portion 1a, the probe 12 is moved along the butted portion 5 in a state that the probe 12 is inserted into the butted portion 5 with the end surface 11a of the rotor 11 pressing against the shoulder portion 1a.

Figure 2B:
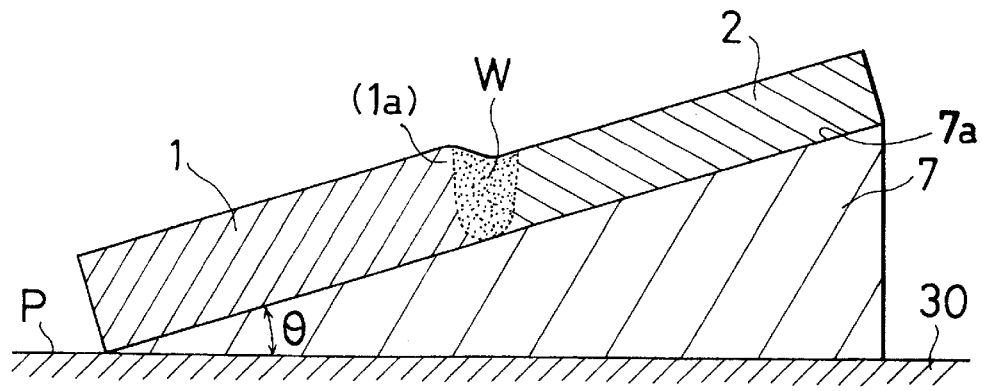
FIG. 2B is a cross-sectional view showing a joined member corresponding to the cross-sectional view of FIG. 2A.

In accordance with the advancing movement of the probe 12, the materials of the joining members 1 and 2 softened and agitated by the rotational movement of the probe 12 are plastically fluidized to go around the probe 12 to fill up a groove formed behind the advancing probe 12. Then, the softened and agitated materials will be cooled and solidified by the immediate loss of the friction heat. This phenomenon will be repeated with the advancing movement of the probe 12, which enables a friction agitation joining of the butted portion 5 of the joining members 1 and 2 along the whole length thereof. Thus, the predetermined joined member as shown in FIG. 2B is obtained. In FIG. 2B, "W" denotes a joined portion formed at the butted portion 5 of the joining members 1 and 2.

Since the joined member has a plastically deformed slop surface at the shoulder portion 1a of the first joining member 1, the stress concentration which may generate at a stepped portion is reduced, resulting in outstanding strength reliability. Therefore, even if the joined member is subjected to various processes, such as bending processes, press forming processes and cutting processes, the joined member would not cause any defects such as unexpected breakages or deformations. Thus, the joined member is excellent in processability.

Furthermore, according to this joining method, as mentioned above, since a quick insertion of the probe 12 and a quick plastic deformation of the shoulder portion 1a of the first joining member 1 can be performed, the insertion speed of the probe 12 and the joining speed of the joining members can be increased, resulting in enhanced joining operation efficiency.

Furthermore, in this joining method, the descending movement of the elevator 20 provided at the joining device A causes an insertion of the probe 12 into the butted portion 5 of the joining members 1 and 2, and gives the pushing force for pressing the shoulder portion 1a to the end surface 11a of the rotor 11. Accordingly, it is advantageous that there is no need to attach any additional apparatus to the joining tool 10 for inserting the probe 12 or giving the pushing force to the end surface 11a of the rotor 11.

Although the friction agitation joining method according to the embodiment of the present invention is explained above, the present invention is not limited to the above embodiment and can be modified in various manners.

For example, in the aforementioned embodiment, although the end surface 11a of the rotor 11 of the joining tool 10 is formed to have a flat surface perpendicular to the rotation axis Q, the end surface 11a of the rotor 11 may be formed into a concave surface which inwardly curves from the outer peripheral edge towards the rotation central portion.

Moreover, in the aforementioned embodiment, the probe 12 is moved along the butted portion 5 to join the butted joining members 1 and 2. Alternatively, in the present invention, instead of moving the probe 12, both the joining members 1 and 2 may be moved so that the butted portion 5 passes the probe 12.

Next, examples of the present invention will be explained.

A plate-like aluminum alloy member (materials: JIS A5052-O, size: 200 mm length×100 mm width×2 mm thickness) was prepared as a first joining member, and a plate-like aluminum alloy member (material:JIS A5052-O, size: 200 mm length×100 mm width×1 mm thickness) was prepared as a second joining member.

A joining tool equipped with a rotor having an end surface outer peripheral diameter $\phi$ of 5 mm and a probe having an outer diameter $\phi$ of 1.5 mm was also prepared.

INVENTIVE EXAMPLE

The first and second joining members were joined in a state that both of them were butted against each other according to the joining method explained in the aforementioned embodiment. The angle of inclination of the joining members to a horizontal plane was 10°.

COMPARATIVE EXAMPLE

Figure 3A:
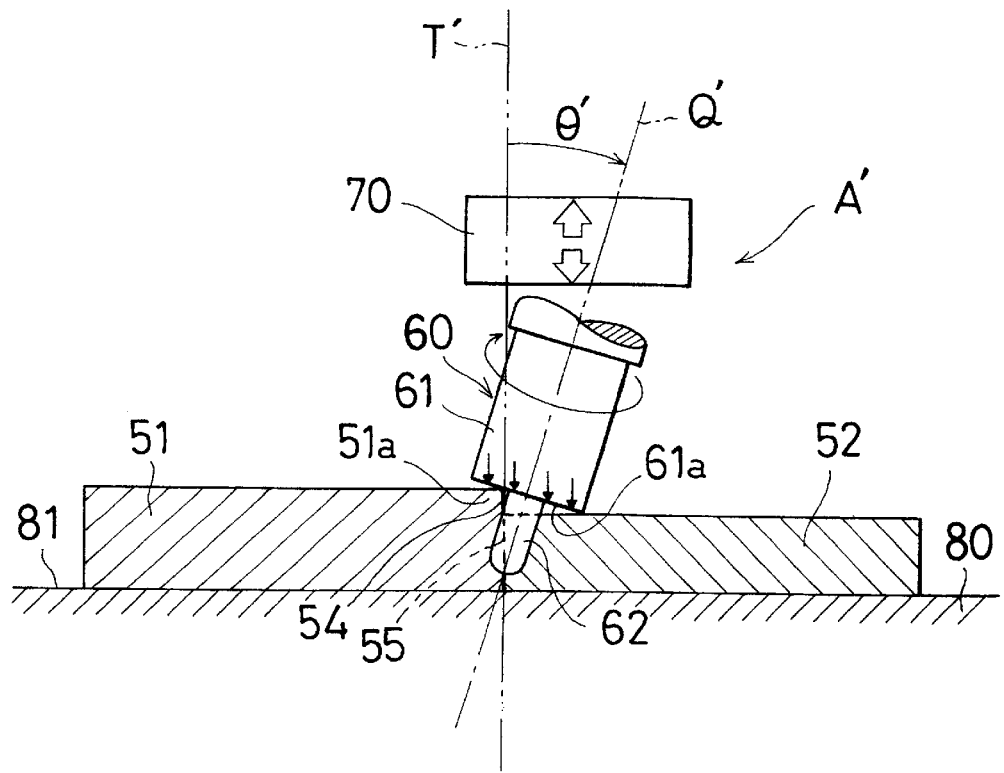
FIG. 3A is a perspective view showing a friction joining method according to a comparative example.
Figure 3B:
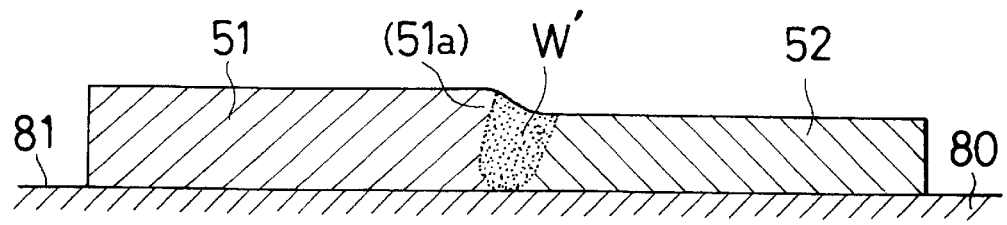
FIG. 3B is a cross-sectional view of a joined member obtained by the friction joining method shown in FIG. 3A.

The first and second joining members 51 and 52 were joined according to the below mentioned joining method. As shown in FIG. 3A, the joining members 51 and 52 were disposed on a horizontal plane 81 with the side surfaces thereof butted against each other, and the joining tool 60 was disposed above the butted portion 55 of the joining members 51 and 52 such that the rotation axis Q' was inclined at the angle θ' to the vertical plane T' extending along the butted portion 55. The inclined angle θ' was 10°. Then, the probe 62 was inserted into the butted portion 55 of the joining members 51 and 52 in the inclined state, and the end surface 61a of the rotor 61 pressed the shoulder portion 51a of one of the joining members 51 having a higher upper surface level formed at the butted portion 55. While keeping the inclined state of the joining tool 60, the probe 62 was advanced along the whole length of the butted portion 55.

The aforementioned inventive example and comparative example were compared. In detail, the limit of the insertion speed of the probe and that of the joining speed of the joining members were investigated by changing the rotation speed of the rotor and that of the probe within the range of from 1000 rpm and 3000 rpm. The results are shown in FIG. 4.

Figure 4:
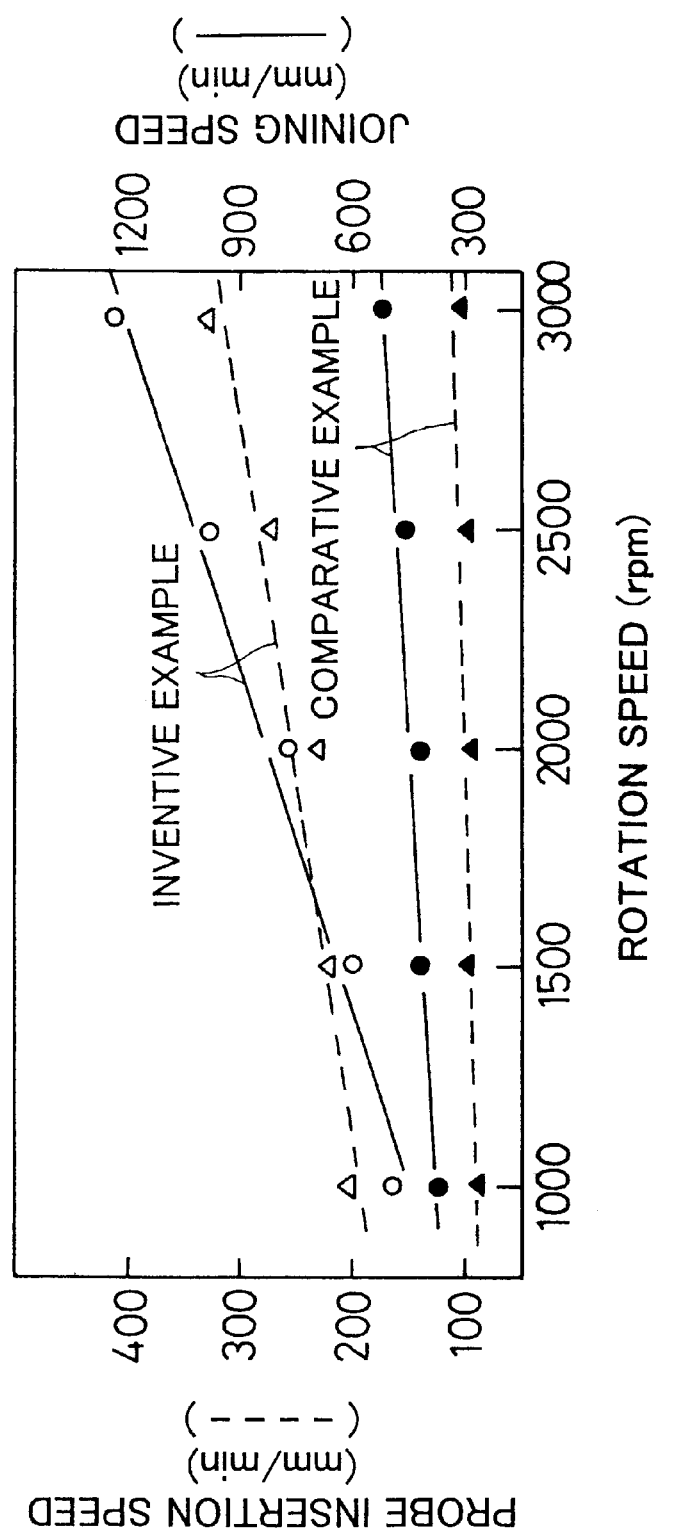
FIG. 4 is a graph showing the relation between a probe insertion speed and a rotation speed of a joining tool and between a joining speed and a rotation speed of a joining tool.
Figure 5A:
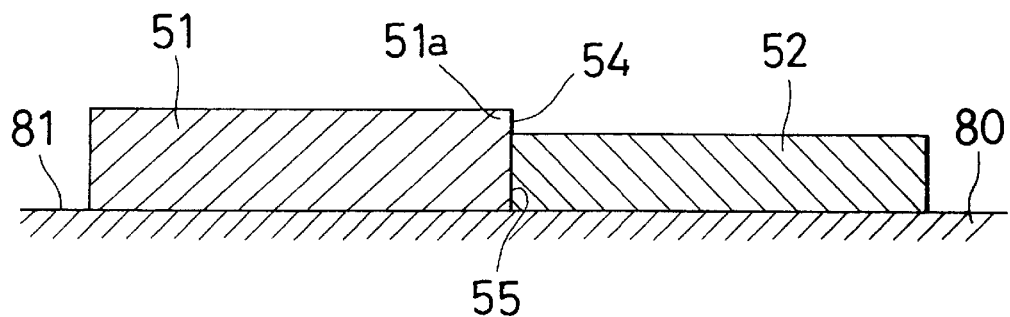
FIG. 5A is a cross-sectional view showing joining members placed on a joining bed with their side surfaces butted against each other.
Figure 5B:
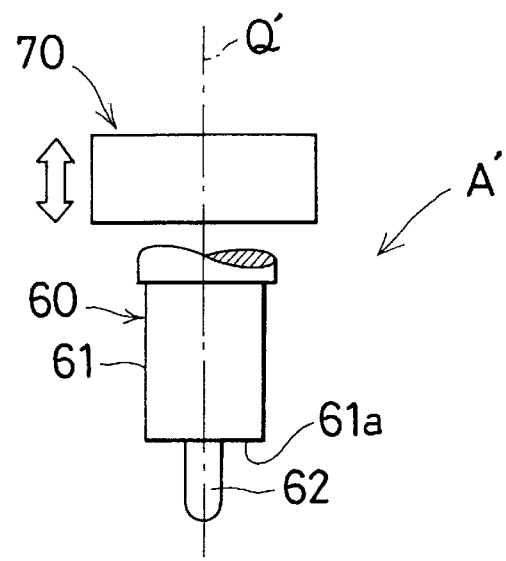
FIG. 5B is a schematic side view of a joining tool.

In FIG. 4, "Δ" and "○" denote the insertion speed of the probe and the joining speed of the inventive example, respectively. "▲" and "●" denote the insertion speed of the probe and that of the joining speed of the comparative example, respectively.

As will be understood from the data shown in FIG. 4, as for the insertion speed of the probe (see "Δ" and "▲"), the comparison of the inventive example and the comparative example reveals that it is possible to increase the insertion speed of the probe in the inventive example than that in the comparative example by 1.3 times or more. As for the joining speed (see "○" and "●"), the comparison of the inventive example and the comparative example reveals that it is possible to increase the joining speed in the inventive example than that in the comparative example by 1.5 times or more. Accordingly, it is confirmed that the present invention can remarkably increase the insertion speed of the probe and the joining speed as compared to the comparative example. In other words, according to the present invention, it is possible to remarkably increase the joining operation efficiency.

On the other hand, a plate-like aluminum alloy member as a first joining member and a plate-like aluminum alloy member as a second joining member were prepared. The difference of the thickness, or the level difference, was 2 mm. In accordance with the joining method mentioned in the preferred embodiment, the limit of the insertion speed of the probe and that of the joining speed were investigated by changing the inclined angle of the joining members to a horizontal plane under the condition that the rotation speed of the rotor and probe is kept constant at 2000 rpm. As a result, in the case where the inclined angle falls within the range of from 3° to 45°, the investigation reveals that the probe insertion speed can be increased by 1.3 times or more and the joining speed can be increased by 1.5 times or more. Thus, it is confirmed that the probe insertion speed and the joining speed can be remarkably increased, in other words, the joining operation efficiency can be remarkably enhanced when the inclined angle falls within the range of from 3° to 45°. Also confirmed is that the preferable inclined angle falls within the range of from 5° to 10°.

According to the friction agitation joining method of the present invention, the insertion speed of the probe and the joining speed can be remarkably increased, resulting in enhanced joining operation efficiency.

Furthermore, in cases where the joining tool is attached to an elevator disposed above the joining members and capable of ascending and descending vertically and the step of inserting the probe is performed by descending the elevator, the insertion of the probe can be performed with high efficiency by utilizing the elevator without preparing any additional device for inserting the probe. This also enhances the effective use of the joining tool.

Furthermore, in cases where the joining tool is equipped to an elevator disposed above the joining members and capable of ascending and descending vertically and the end surface of the rotor presses the shoulder portion of one of the joining members having a higher upper surface level formed at the butted portion by descending the elevator, pressing the shoulder portion can be performed with high efficiency without preparing any additional device for pressing the shoulder portion. This also enhances the effective use of the joining tool.

This application claims priority to Japanese Patent Application No. 2000-197524 filed on Jun. 30, 2000, the disclosure of which is incorporated by reference in its entirety.

The terms and expressions which have been employed herein are used terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A friction agitation joining method for joining two plate-shaped joining members butted against each other with a level difference formed at upper surface sides thereof by utilizing a joining tool having a probe rotatable about a rotation axis thereof, said friction agitation method, comprising the steps of:

inclining said butted joining members with respect to a horizontal plane so that one of said joining members having a higher upper surface level is positioned at a lower side and the other of said joining members having a lower upper surface level is positioned at a higher side;

inserting said probe rotating about said rotation axis into a butted position of said butted joining members or the vicinity thereof in a state that said rotation axis is generally parallel to a vertical plane extending along said butted portion; and moving said probe relative to said butted joining members along said butted portion with said probe inserted into said butted portion or the vicinity thereof.

2. The friction agitation joining method as recited in claim 1, wherein said step of inserting said probe is performed in a state that said rotation axis is disposed vertically.

3. The friction agitation joining method as recited in claim 1, wherein said joining tool is attached to an elevator disposed above said butted joining members and capable of ascending and descending vertically, and wherein said step of inserting said probe is performed by descending said elevator.

4. The friction agitation joining method as recited in claim 1, wherein said joining tool is provided with a rotor having a diameter larger than a diameter of said probe protruded from a part of an end surface of said rotor, said rotor being capable of rotating about said rotation axis, and wherein said step of moving said probe relative to said butted joining members is performed in a condition that said end surface of said rotor rotating about said rotation axis presses a shoulder portion of one of said joining members having a higher upper surface level formed at said butted portion.

5. The friction agitation joining method as recited in claim 4, wherein said end surface of said rotor vertically presses said shoulder portion.

6. The friction agitation joining method as recited in claim 4, wherein said joining tool is equipped to an elevator disposed above said butted joining members and capable of ascending and descending vertically, and wherein said end surface of said rotor presses said shoulder portion by descending said elevator.

7. The friction agitation joining method as recited in claim 4, wherein said joining members are arranged so as to be inclined at from 3° to 45° to a horizontal plane.

8. The friction agitation joining method as recited in claim 4, wherein said joining members are arranged so as to be inclined at from 5° to 10° to a horizontal plane.

9. The friction agitation joining method as recited in claim 1, further comprising a step of providing a stand having an upper surface inclined to a horizontal plane, wherein said butted joining members are arranged on said inclined upper surface of said stand to thereby be inclined to a horizontal plane.

10. The friction agitation joining method as recited in claim 1, wherein said probe is rotated at a rotation speed of from 1000 rpm to 3000 rpm.

11. The friction agitation joining method as recited in claim 1, wherein one of said joining members having a higher upper surface level is positioned at a lower side and is thicker than the other of said joining members having a lower upper surface level and being positioned at a higher side, and wherein said one of said joining member having a higher upper surface level and said the other of said joining member having a lower upper surface level are butted against each other with bottom surfaces thereof flush with each other.

* * * * *

UNITED STATES PATENT AND TRADEMARK OFFICE
CERTIFICATE OF CORRECTION

PATENT NO. : 6,585,147 B2
DATED : July 1, 2003
INVENTOR(S) : Shigetoshi Jogan

It is certified that error appears in the above-identified patent and that said Letters Patent is hereby corrected as shown below:

Title page,
Item [73], Assignee, "Showa Aluminum Corp., Osaka (JP)" and replace with -- Showa Denko K.K., Tokyo, Japan --.

Signed and Sealed this

Twenty-fifth Day of October, 2005

JON W. DUDAS
*Director of the United States Patent and Trademark Office*